United States Patent

[11] 3,611,386

[72] Inventor Lloyd J. Perper
 3725 Ironwood Hill Drive, Tucson, Ariz. 85705
[21] Appl. No. 842,188
[22] Filed July 16, 1969
[45] Patented Oct. 5, 1971
 Continuation-in-part of application Ser. No. 745,819, July 18, 1968, now abandoned.

[54] PREFILTERED RADIO DIRECTION FINDERS
 9 Claims, 3 Drawing Figs.
[52] U.S. Cl. .................................................. 343/117, 343/120
[51] Int. Cl. ............................................... G01s 3/42
[50] Field of Search ........................................... 343/117, 120

[56] References Cited
 UNITED STATES PATENTS
 2,562,986 8/1951 Lakatos ..................... 343/117
 3,156,916 11/1964 Byatt ......................... 343/117
 3,355,736 11/1967 Perper ....................... 343/113
 3,390,392 6/1968 Mayer et al. ................ 343/117

Primary Examiner—Rodney D. Bennett, Jr.
Assistant Examiner—R. Kinberg
Attorney—James A. Eyster ABSTRACT: An automatic radio direction finder for use under high static conditions includes two narrow-band filter units, with limiters, one in the sensing antenna channel and one in the directional antenna channel preceding the reversing switch or modulator. Because of this filtering, after modulation and addition the sensing channel and the two directional sidebands appear at three nonoverlapping frequency locations, so that high noise in the sensing channel does not interfere with the directional sidebands. The demodulated signal is employed in the usual manner to control the position of the directional antenna but, because of the noise segregation, the position accuracy is unaffected by the presence of noise. One embodiment uses cross correlation with synchronous detection; another embodiment uses envelope detection.

INVENTOR.
Lloyd J. Perper

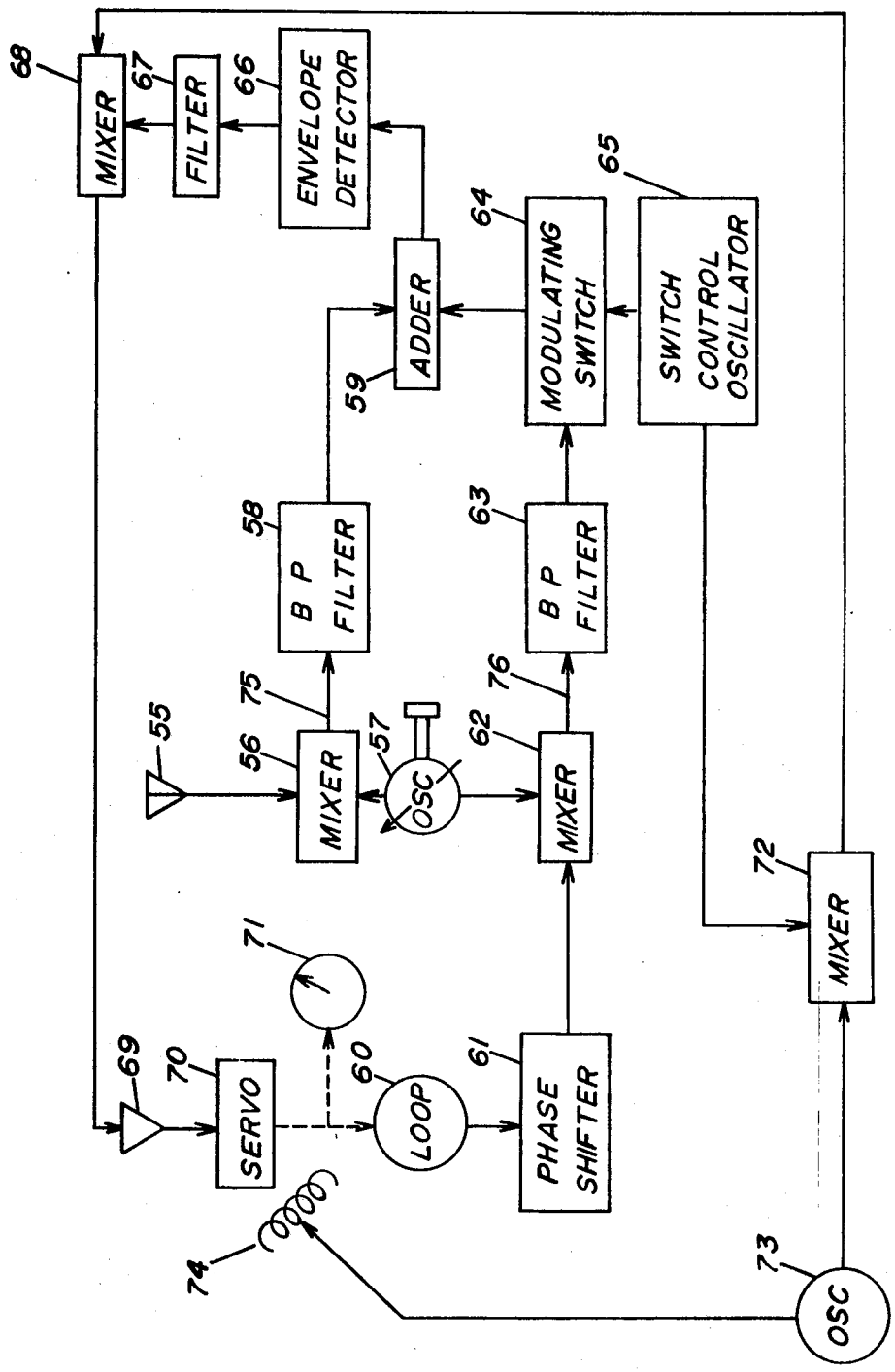

PREFILTERED RADIO DIRECTION FINDERS

CROSS REFERENCES TO RELATED APPLICATIONS

This application is a continuation-in-part of my copending application, Ser. No. 745,819., filed July18, 1968, for improvements in prefiltered radio direction finders.

BACKGROUND OF THE INVENTION

This invention relates to automatic radio direction finders.

Automatic radio direction finders typically employ a directional loop antenna and an omnidirectional or sense antenna. The loop output is periodically modulated or reversed, then mixed with the sense antenna output. The mixed signal is envelop detected and the output is employed to move the loop toward its null position; the position 90° thereto then indicates the direction from which signals are being received, with 180° ambiguity resolved by the sense antenna signal.

In such a conventional circuit the sense antenna signal is stronger than the loop signal. Both signals carry radio noise including atmospherics, engine ignition noise and precipitation static; local noise tends to be greater in the sense antenna output than in the loop output; all noise signals are added in the common channel. As a result, the strong noise signal from the sense antenna tends to drown out the weak signal of interest from the loop antenna, and also to cause the direction indication to point toward the noise source.

As a specific example of current practice, a switch operating at 110 Hz. reverses the output of a loop which receives signal and noise in a 4 kHz. band. The modulated signal then contains the signal of interest as sidebands 220 Hz. apart; the sense signal, when added, introduces a strong signal at carrier frequency, with associated strong noise. The locally produced sideband signals cause loop control activation which may alternatively and erroneously be caused by a second received signal at a frequency 110 Hz. from that of the desired transmitting station signal.

SUMMARY OF THE INVENTION

The present invention eliminates these faults of present automatic radio direction finders by filtering the antenna signals before combining and demodulating. This eliminates the superposition of the strong sense antenna noise on the weak loop signal and eliminates the confusion of the loop sidebands with any received interfering station signal. The practical result is an ability to receive and use signals which are too weak to actuate a conventional direction finder in noise or interference. This is of particular importance in the reception of VLF, LF, and MF signals, for which this invention is especially adapted.

One purpose of this invention is to provide an improved automatic radio direction finder relatively impervious to all kinds of radio interference.

Another purpose of this invention is to provide a prefiltered automatic radio direction finder in which radio noise received by an omnidirectional antenna does not mask the signal or modify the apparent direction from which the signal is received.

Another purpose of this invention is to provide a prefiltered radio direction finder which separates a wanted signal from an unwanted signal of nearly the same frequency, without introducing bearing errors when their difference frequency corresponds to the ADF switching frequency.

BRIEF DESCRIPTION OF THE DRAWING

A better understanding of the invention can be secured by reference to the following detailed description and the drawings, in which:

FIG. 3 is a diagram depicting a second embodiment of the invention.

DESCRIPTION OF THE PREFERRED EMBODIMENTS

Figure 1:
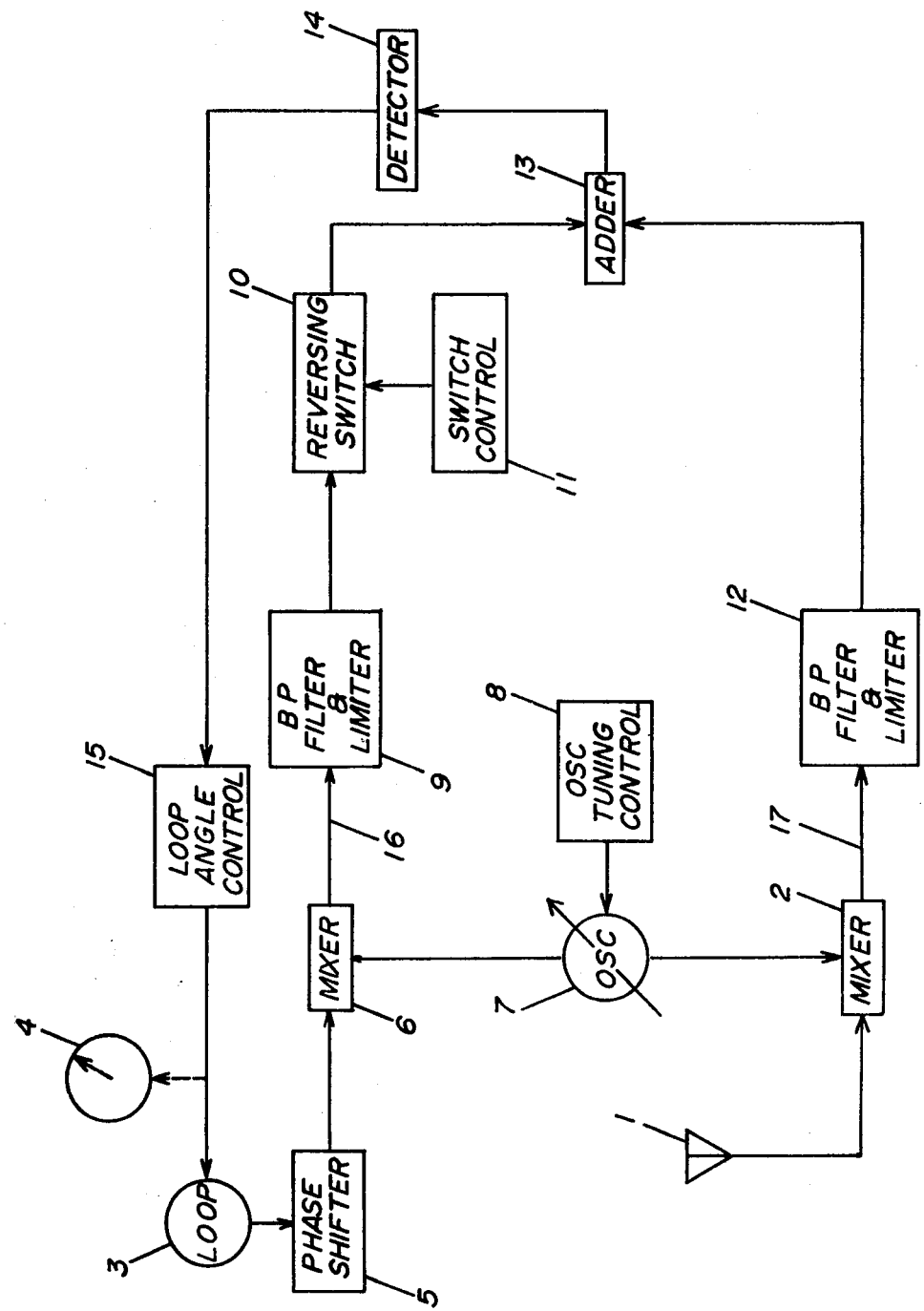
FIG. 1 is a generic diagram of the invention.

Referring now to FIG. 1, an omnidirectional sense antenna 1 is connected to a mixer 2. This antenna may alternatively be a directional loop antenna kept pointed in the approximate direction of maximum intensity of the desired signal. A second antenna, 3, must be directional, and may consist of a rotatable vertical loop if reception of a horizontal signal is desired. This antenna may, instead, consist of a fixed pair of crossed loops connected to a goniometer. The angle indicator 4 represents an azimuth scale on a rotatable loop or on a goniometer, or an equivalent indicator.

The loop 3 output is connected through a 90° phase shifter 5 to a mixer 6. Each of the mixers 2 and 6 receives a second input from an adjustable oscillator 7, controlled manually, or otherwise, through a control 8. The output of mixer 6 is connected to a band-pass filter 9 which may if desired include a limiter, having a passband passband width, for example, in the order of 100 Hz. Its output is connected to a reversing switch 10 actuated periodically by a control 11. In place of reversing switch 10 a modulator may be used. The output 17 of mixer 2 is passed through a band-pass filter 12, including if desired a limiter, which should have the same bandwidth as filter 9 and must have the same center frequency.

The frequency of the reversing switch 10 or equivalent oscillator need not be high enough to preserve the harmonics and waveform of an incoming signal and in fact, since the principal object of this invention is to receive ADF signals through heavy static, the switch frequency need be only a few hertz as, for example, 110 Hz.

The bandwidth of the filter/limiters 9 and 12 must be materially less than the frequency of switch 10, otherwise the primary object of segregating the three signals, with their noise, in separate nonoverlapping parts of the frequency spectrum will not be attained. For example, if the switch 10 frequency is 110 Hz., the filter/limiter bandwidths may be 100 Hz.

The filter/limiters 9 and 12 may each consist, for example, of a 100 Hz. filter to segregate the signals as described above, followed by a limiter which has the function of preventing paralysis of following stages by heavy static, in turn followed by a second 100 Hz. filter to eliminate harmonics generated by the limiter.

The limiter in element 9 is not so necessary as the limiter in element 12, because of the much higher static interference level in the latter, and the element 9 limiter may therefore in some cases be omitted.

The outputs of filter and limiter 12 and switch 10 are connected to an adding circuit 13. The output of adding circuit 13 is detected or demodulated at 14. The demodulated output is applied to a loop angle control device 15, where it is interpreted, amplified and transduced to a mechanical signal suitable for rotating loop 3 and indicator 4.

In operation, both the loop carrier and the sense antenna carrier are frequency shifted by mixers 2 and 6 to the same intermediate frequency in conductors 16 and 17. Tuning control 8 serves to tune the receiver to any incoming signal. The frequency of switch or modulator 10 is high enough that the resulting carrier sidebands, together with their associated noise, are in two separate regions of the frequency spectrum and the sense antenna signal, together with its associated noise, is in a third, separate portion of the frequency spectrum. Thus the relatively strong noise signal received through the sense antenna has been separated from the two sideband carrier signals resulting from the loop antenna reception. The latter are therefore not masked by sense noise; the only noise associated with each is that passing the loop filter/limiter 9.

If a second, interfering carrier should be received which in a conventional ADF would produce an erroneous loop indication and phase lock, the interfering carrier will not be passed by either filter/limiter, if outside its pass band, and no interference will be caused.

Figure 2:
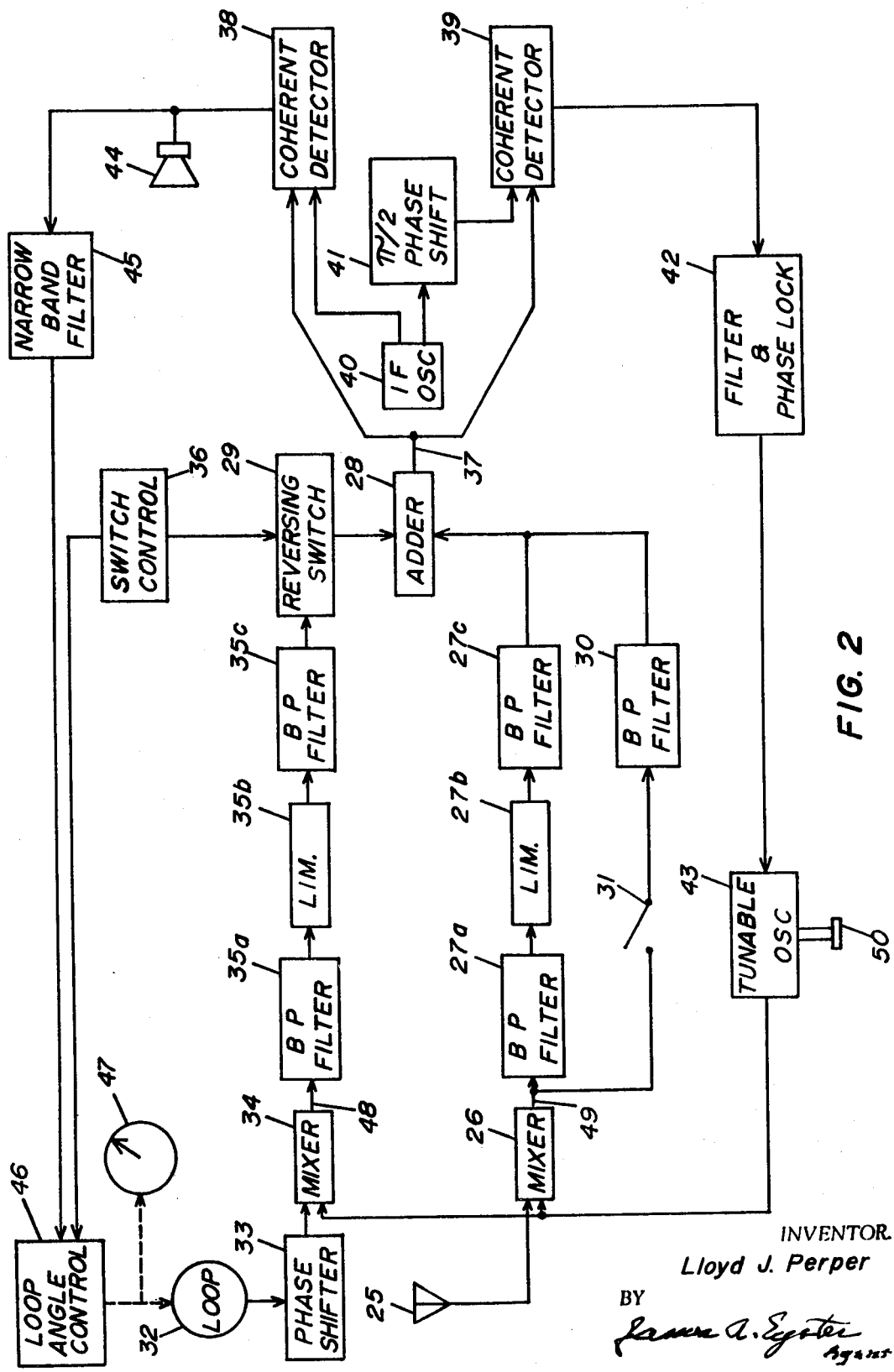
FIG. 2 is a diagram depicting one embodiment of the invention.

In FIG. 2 an omnidirectional or sense antenna 25 feeds a mixer 26. The mixer 26 output is applied to a narrow band-pass filter/limiter which may, for example, consist of a 100-Hz. bandwidth filter 27a followed by an amplitude limiter 27b followed by a 100-Hz. bandwidth filter 27c. The filters 27a and 27c have bandwidths materially less than the frequency of reversing switch 29 and their pass bands are centered at the center of the intermediate frequency applied to filter 27a. The output of filter 27c is applied to an adder 28. The filter/limiter 27a-27bq-27c is paralleled by a wider band-pass filter 30, optionally connected through a manual switch 31. The pass band of filter 30 is designed to pass voice frequencies, but has a nonpass band to reject modulation at the switch 29 reversing frequency.

A directional antenna 32, preferably a loop antenna, is connected through a π/2 phase shifter 33 to a mixer 34. Mixer 34 is connected to a narrow band-pass filter/limiter identical in characteristics to the filter/limiter 27a-27b-27c, and consisting of filter 35a, limiter 35b and filter 35c. The filter 35c is connected through a reversing switch 29 to adder 28. Switch 29 is controlled by control 36.

The adder 28 output 37 is applied to two coherent or synchronous detectors 38 and 39. An oscillator 40 having the intermediate frequency has its output applied directly to coherent detector 38 and also through a π/2 phase shifter 41 to coherent detector 39.

The output of coherent detector 39 is applied through a low-pass filter and phase feedback circuit 42 to control a tunable oscillator 43. Component 42 prevents any intermediate frequency from reaching oscillator 43, and also performs an integrating function as a loop filter. The oscillator 43 output is applied to mixers 26 and 34.

The output of coherent detector 38 is applied to a speaker 44 and also through a narrow-band filter 45 to a loop angle control 46. Band-pass filter 45 has a pass band several cycles wide centered at the frequency of the reversing switch 29, for the purpose of removing voice frequencies and noise. The control 46 is connected to rotate loop 32 and indicator 47, which indicates loop azimuth angle.

In the operation of the embodiment of FIG. 2, the carrier signal, typically 300 kHz., and associated noise received by loop 32 and sense antenna 25 are frequency-shifted by mixers 26 and 34 to an intermediate frequency in conductors 48 and 49. This IF is, for example, 100 kHz. Band-pass filters 27a, 27c, 35a and 35c, typically 100 Hz. in width, have their center frequencies at the intermediate center frequency. Switch control 36 is typically a 110 Hz. oscillator, controlling switch 29 to reverse the output of filter 35 at that rate. Thus, in the output of adder 28 there appears at 100 kHz. an IF signal representing the carrier received by the sense antenna, with its associated noise to a distance of 50 Hz. on either side thereof and, at frequencies 110 Hz. above and below that carrier, namely at 99,890and 100,110Hz., there appear two other signals representing the loop carrier signal, each with loop noise to a distance of 50 Hz. on either side of each of the two carrier representations.

The sense antenna signal and noise have thus been segregated, by frequency separation, from the loop antenna signal and noise represented by the two sidebands.

The output 37 of adder 28 is applied to the detectors 38 and 39, where the IF signal is mixed with the output of oscillator 40 and synchronously demodulated. The detector 38 output therefore contains no intermediate frequency, except leakage, but only the modulation, with amplitude representing the angle of loop 32 and polarity representing the phase relationship between the radiofrequency loop and sense antenna signals.

The demodulator output of detector 38, at 110 Hz., is passed through filter 45 to the loop angle control 46 which may, for example, be a 110 Hz. two-phase motor with one phase winding excited continuously from switch control 36 and the other excited from the filter 45. As the motor 46 rotates the loop 32 toward its null position, with the plane perpendicular to the incoming radiation, the output of filter 45 decreases in amplitude toward zero at the null. The indicator 47 is adjusted so that it then indicates the azimuth angle of the incoming radiation.

The output of detector 38 is also applied to the speaker 44 which, when the voice band switch 31 is closed, emits any voice or tone modulation which the incoming signal radiation may carry.

The output of coherent detector 39 is applied through loop filter 42 to tunable oscillator 43 to override and maintain its frequency and phase, as manually set by knob 50 to a selected incoming signal. The oscillator 43 output, applied to mixers 26 and 34, causes the incoming signal frequency to be transformed to an intermediate frequency in conductors 49 and 48.

The π/2 phase shift circuit 41, in accordance with the cross correlation function, causes the output of coherent detector 39 in the phase-lock loop to become zero when the IF oscillator 40 and the incoming signal are effectively in phase. Any change in phase of the incoming signal causes the tunable oscillator 43, by action of the phase-lock loop, to change in phase to maintain the IF phase as before in conductors 48 and 49. The operation of the phase-lock loop also causes rejection of interfering signal frequencies. The signal discrimination may readily be effected for signal spacings of less than 10 Hz.

The receiver of FIG. 2 effects cross correlation, in which the input radiation signal is multiplied by the output of oscillator 40 in detector 39, and in which the product out of detector 39 is integrated in the filter and phase-lock circuit 42. This circuit 42 also introduces the necessary 90° phase lag when the loop is nulled.

In FIG. 3 an omnidirectional sense antenna 55 applies its signal to a mixer 56 to which also is applied the output of manually tunable oscillator 57. The demodulator output is passed through a band-pass filter 58 to an adder 59.

A directional loop antenna 60 applies its output through a phase shifter 61 to a mixer 62 also energized from oscillator 57. The demodulated output is applied through a filter 63 and a modulating switch 64 to adder 59. Switch 64 is controlled by an oscillator 65. The adder output is demodulated in an envelope detector 66. The demodulated output is filtered at 67, mixed at 68, amplified at 69 and then applied to a servo 70. The servo 70 rotates the loop 60 and azimuth indicator 71.

The switch control oscillator 65 output is also applied to a mixer 72. An oscillator 73 applies a second input to mixer 72 and also actuates a reference input coil 74 of servo 70. The output of mixer 72 is applied to mixer 68.

In operation, the oscillator 57, manually tuned to receive the desired signal, produces an intermediate frequency of, for example, 150 kHz. in the mixer outputs 75 and 76. They are filtered by similar filters 58 and 63 each having a band pass of 1,000 Hz. centered at the intermediate frequency center.

The switch control oscillator 65 may have, for example, a frequency of 7,500 Hz. and the oscillator 73 may have a frequency of 100 Hz. The output of mixer 72 will then have sum and difference frequencies of 7,400 and 7,600 Hz. The filter 67 may, for example, have a band pass of 7,500 Hz. ±1,000 Hz. The difference frequencies generated in mixer 68 will then each be 100 Hz. This signal, amplified at 69, through servo 70 drives the loop 60 and indicator 71 toward null, at which point the signal will become zero.

Separation of the sense and loop signals, each with its accompanying noise, occurs here in the same way as in the circuit of FIG. 2. The sense signal and its 1,000 Hz. band of noise in the output of adder 59 will be at intermediate frequency, while the loop signal and its noise will form two sidebands, each distant from the center of the intermediate frequency by the amount of the switch control oscillator 65 frequency. So long as the band widths of filters 58 and 63 are substantially less than oscillator 65 frequency, neither these three signals nor their accompanying noise bands can intermix. Thus the large magnitude noise of the sense antenna cannot mask the small signal of interest from the loop antenna.

Envelope detection by detector 66 of the loop sideband signals in the presence of the sense signal results in an unambiguous signal having maximum amplitude when loop 60 is pointed with its plane toward the transmitting station and having approximately zero amplitude when the plane is 90° from the signal direction of approach.

I claim:

1. A radio direction-finding system for detecting the angle of arrival of an incoming electromagnetic radiation signal comprising:
    first and second sensing means sensitive to an electromagnetic radiation signal, at least said first means having a direction-sensing property and being rotatable;
    means for frequency converting the outputs of said first and second sensing means to two signals in first and second separate channels, respectively, at an identical intermediate frequency;
    first and second band-pass filters having similar bandwidths and at band center said identical intermediate frequency, said first and second band-pass filters being positioned in said first and second separate channels, respectively;
    modulating means in said first separate channel, the modulating means having a selected frequency;
    means for adding the output of said modulating means and of said second band-pass filter to form a composite signal in a single channel;
    coherent detector means in said single-channel receiving said composite signal, said coherent detector means including an oscillator at said intermediate frequency emitting a waveform substantially similar to that of said incoming electromagnetic radiation;
    a narrow-band filter having a pass band at said selected frequency of the modulating means, said narrow-band filter being connected to receive an output of said coherent detector means;
    control means actuated through said narrow-band filter for applying a signal to said first sensing means to control its angular position;
    an angle indicator on said first sensing means; and
    means connected to the output of said coherent detector means for phase locking the radio direction-finding system to the incoming signal, said phase-locking means including an integrating circuit and a tunable oscillator, the latter being connected to said means for frequency converting.

2. A radio direction-finding system in accordance with claim 1 in which said first and second band-pass filters have each a bandwidth less than the frequency of said periodic modulation.

3. A radio direction-finding system in accordance with claim 2 in which said first sensing means is a directional loop antenna.

4. A radio direction-finding system in accordance with claim 3 in which said second sensing means is an omnidirectional antenna.

5. A radio direction-finding system for detecting the angle of arrival of an incoming electromagnetic radiation signal comprising:
    first and second sensing means sensitive to an electromagnetic radiation signal, at least first said means having a direction-sensing property and being rotatable;
    means for frequency converting the outputs of said first and second sensing means to two signals in first and second separate channels, respectively, at an identical intermediate frequency;
    first and second band-pass filters having similar bandwidths and having at band center said identical intermediate frequency, said first and second band-pass filters being positioned in said first and second separate channels, respectively;
    modulating means in said first separate channel, said modulating means having a selected frequency;
    means for adding the output of said modulating means and of said second band-pass filter to form a composite signal in a single channel;
    an envelope detector in said single-channel receiving said composite signal;
    a filter in said single-channel following said envelop detector, this filter having a narrow-pass band centered at the frequency of said modulating means;
    a first mixer actuated from said filter;
    control means actuated by the output of said first mixer for applying a signal to said first sensing means to control its angular position;
    an oscillator;
    a second mixer-receiving energizing signals from said modulating means at the periodic frequency thereof and also receiving energizing signals from said oscillator;
    a connection from the output of said second mixer to an input of said first mixer; and
    an angle indicator on said first sensing means.

6. A radio direction-finding system in accordance with claim 5 in which each of said first and second band-pass filters has a bandwidth less than the frequency of said modulating means.

7. A radio direction-finding system in accordance with claim 6 in which said first sensing means is a directional loop antenna.

8. A radio direction-finding system in accordance with claim 7 in which said second sensing means is an omnidirectional antenna.

9. A radio direction-finding system for detecting the angle of arrival of an incoming electromagnetic radiation signal comprising:
    first and second sensing means sensitive to an electromagnetic radiation signal, at least said first means having a direction-sensing property and being rotatable;
    means for frequency converting the outputs of said first and second sensing means to two signals in first and second separate channels, respectively, at an identical intermediate frequency;
    first and second initial band-pass filters having similar bandwidths and at band center said identical intermediate frequency, said first and second initial band-pass filters being positioned in said first and second separate channels respectively;
    first and second limiters, one in each of said two separate channels following said first and second initial band-pass filters, respectively;
    first and second secondary band-pass filters, one in each of said two separate channels, following said first and second limiters, respectively, said secondary filters having bandwidths similar to those of said initial filters;
    modulating means in said first separate channel following said first secondary band-pass filter;
    means for adding the output of said modulating means and of said second band-pass secondary filter to form a composite signal in a single channel;
    coherent detector means in said single-channel receiving said composite signal, said coherent detector means including an oscillator at said intermediate frequency emitting a waveform substantially similar to that of said incoming electromagnetic radiation;
    a narrow-band filter having a pass band at said selected frequency of the modulating means, said narrow-band filter being connected to receive an output of said coherent detector means;
    control means actuated through said narrow-band filter for applying a signal to said first sensing means to control its angular position;
    an angle indicator on said first sensing means; and
    means connected to the output of said coherent detector means for phase locking the radio direction-finding system to the incoming signal, said phase-locking means including an integrating circuit and a tunable oscillator, the latter being connected to said means for frequency converting.